United States Patent [19]

Bareis et al.

[11] 4,108,320
[45] Aug. 22, 1978

[54] ALIGNING AND STAMPING ARRANGEMENT

[75] Inventors: Alfred Bareis, Uhingen; Karl Dangelmaier, Göppingen-Holzheim; Reinhard Braun, Eislingen, all of Fed. Rep. of Germany

[73] Assignee: L. Schuler GmbH, Fed. Rep. of Germany

[21] Appl. No.: 776,940

[22] Filed: Mar. 11, 1977

[30] Foreign Application Priority Data

Mar. 11, 1976 [DE] Fed. Rep. of Germany ....... 2610123

[51] Int. Cl.² ............................................. B65G 57/16
[52] U.S. Cl. ......................................... 214/8; 29/732; 29/738
[58] Field of Search .................. 214/8; 29/241, 433, 29/609, 732, 738

[56] References Cited

U.S. PATENT DOCUMENTS

| | | | |
|---|---|---|---|
| 1,426,759 | 8/1922 | Nickol | 29/738 X |
| 2,283,629 | 5/1942 | Heftler | 29/433 |
| 2,855,113 | 10/1958 | Roske | 214/8 X |
| 2,964,840 | 12/1960 | Saylor et al. | 29/738 |
| 2,973,108 | 2/1961 | Gable | 214/8 |
| 4,046,264 | 9/1977 | Bergmann et al. | 214/8 |

FOREIGN PATENT DOCUMENTS 429,929 10/1974 U.S.S.R. ................................ 29/738

*Primary Examiner*—L. J. Paperner
*Attorney, Agent, or Firm*—Craig & Antonelli

[57] ABSTRACT

An arrangement for aligning and stacking laminations for electrical equipment and for transporting formed stacks of laminations with the laminations being fed individually in the same position to a stack former which maintains the relative positions of the laminations. The laminations include a circular inner or outer circumference and a plurality of stampings distributed about the surface of the laminations at equal centering angles. The stack former is provided with an appropriate circular circumference and a guide which can be introduced into at least one stamping. The stack former is rotatably mounted relative to its longitudinal axis and is provided with a rotary drive which operates in a stepwise manner with the rotary steps of the drive being equal to the central angle of the stampings of the stamping pattern or a whole number multiple thereof.

18 Claims, 3 Drawing Figures

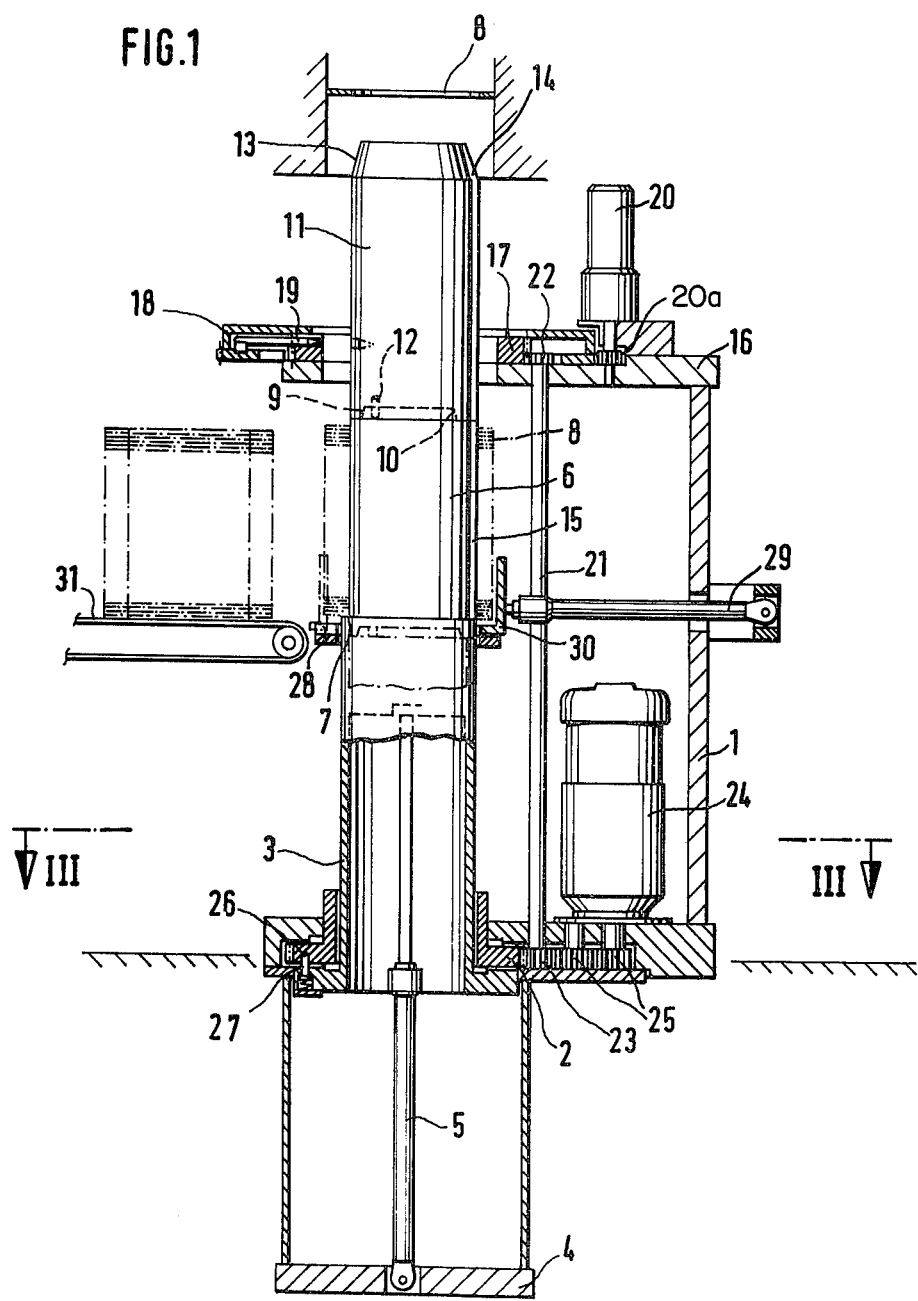

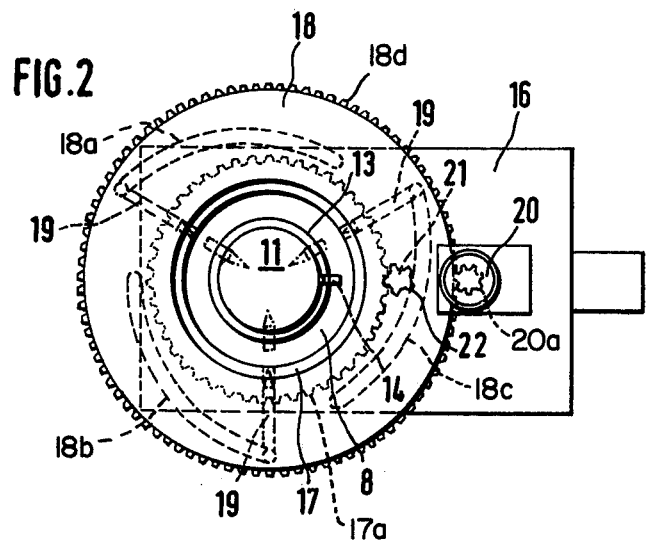
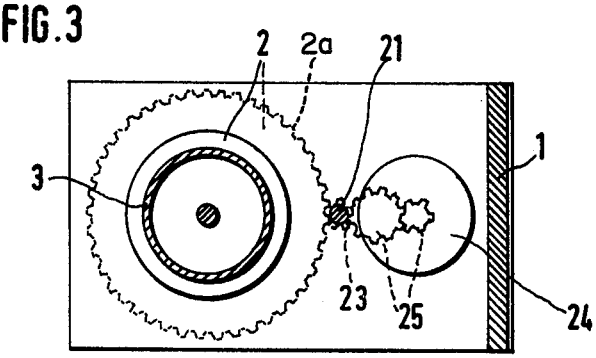

ALIGNING AND STAMPING ARRANGEMENT

The present invention relates to an alignment and stacking arrangement and, more particularly, to an alignment and stacking arrangement for aligning and stacking laminations for electrical equipment with the laminations being manufactured by a continuous stamping method wherein the laminations are individually fed in the same position to a stack former which maintains the relative position of the respective laminations by way of guide means.

An aligning and stacking device is proposed in German Auslegeschrift 11 10 118 which stacks E-shaped laminations for magnetic cores of transformers or similar laminations which are aligned only in one specific position determined by a stamping process with a plurality of ridges disposed on various sides of the stack to be formed constituting a guide of the stack former for determining the relative position of the laminations.

While this proposed device operates satisfactorily for alignment and stacking of laminations which can be aligned and stacked in only a single position, if alignment and stacking of laminations with a circular inner or outer circumference is involved, which laminations have a stamped form including a plurality of stampings, for example, groove, equiangularly distributed about the periphery of the laminations, an alignment of the stack as it is formed is not possible but rather each lamination or a plurality of successive laminations can be stacked only after being rotated by a central angle relative to a previous lamination or a plurality of successive laminations with the central angle being equal to the central angle of the stampings of the stamped form or a whole number multiple thereof.

The aim underlying the present invention essentially resides in providing an alignment and stacking arrangement which produces a stack of laminations for electrical equipment and which offsets inhomogeneities in the material, for example, the varying thickness of the individual laminations which may occur in normal stamping operations throughout the height of the stack and which achieves a predetermined orientation of non-circular outer contours of laminations with a circular inner circumference from one lamination to the next and throughout the height of the stack of laminations.

The underlying problems are solved according to the present invention by providing a stack former with an appropriate circular configuration and a guide means which can be introduced into at least one stamping with the stack former being rotatably mounted relative to its axis by a stepwise operating rotary drive, the steps of which are equal to a central angle of the stamping pattern or a whole number multiple thereof.

Advantageously, the guide means may be constructed as guide ridges or ribs disposed on the outer circumference of the mandrel or the inner circumference of a tube or tubes constituting the stack former if the stampings in the laminations are made in the form of grooves which extend from their circular inner and outer circumferences.

Stack formers for stacking laminations with a circular inner and/or outer circumference constructed as mandrels with a circular outer circumference or tubes with a circular inner circumference have been proposed, for example, in British Pat. No. 1,307,961 and VDI Guideline 3246, Mar. 1965, page 25, FIG. 105; however, such proposed devices themselves cannot be employed in solving the problems to which the present invention is addressed nor are such devices suitable therefor.

To feed the individual laminations in the same position to the stack former, the stack former may be disposed vertically beneath a matrix of a punch die in the manner disclosed, for example, in the aforementioned German Auslegeschrift 11 10 118 and disposed below a delivery end of a horizontal conveyor in the manner described, for example, in German Auslegeschrift 20 19 661 thereby ensuring that the laminations reach the horizontal conveyor in the same position, are maintained in such position on the horizontal conveyor during their transport, and are delivered at the delivery end of the horizontal conveyor individually in such position.

Advantageously, the stack former may be mounted beyond a cutting shear at which the laminations, previously stamped in a continuous stamping process out of a strip of lamination material, are separated from the strip of material with the cut laminations each being in the same position and falling directly into the stack former.

According to another feature of the present invention, the stack former includes two stacking members which are mounted one above the other in axial alignment with the two stacking members being selectively separable so that one of the stacking members forms an intermediate stack while the laminations formed on the other stacking member are removed from the stack former. By virtue of this arrangement, it is possible to align and stack laminations during a continuous stamping operation.

In accordance with yet another feature of the present invention, to facilitate the formation of an intermediate stack at a stacking member, stacking or holding elements are selectively displaceable into and out of a stacking area. Preferably, the stacking elements engage portions of the stacking member so as to grip and hold the same in a given position.

According to another feature of the present invention, means are provided for rotating the intermediate stack forming arrangement relative to the axis of the stack former with the rotation being effected in a stepwise manner. Preferably, the rotary steps of the drive are equal to a central angle of the stampings of the stamped form or a whole number multiple thereof.

Advantageously, according to the present invention, a common rotary drive is provided for the stack former and the intermediate stack forming arrangement with the common rotary drive being operatively connected with either the stack former or, by way of the stacking elements, with one of the stacking members of the stack former so as to maintain a uniform operation.

In accordance with the present invention, the rotary drive includes a rotary ring having two relatively rotatable ring members one of which is permanently coupled to a rotary drive means with the other ring member being effective to actuate the stacking elements, advantageously formed as radially displaceable pins, to cause the elements to be selectively engaged or disengaged with an upper stacking member of the stack former.

To ensure the accurate aligning and stacking of laminations, preferably, according to the present invention, the stack former is provided with at least one ridge or rib on its outer circumference to serve as a guide for groove-shaped stampings on the laminations which extend out from a circular inner circumference of the laminations. Moreover, the stack former may be of a tubular configuration so as to facilitate stacking of laminations with a circular outer circumference.

Accordingly, it is an object of the present invention to provide an aligning and stacking arrangement for laminations manufactured in a continuous stamping operation which avoids by simple means the drawbacks and shortcoming encountered in the prior art.

A further object of the present invention resides in providing a stacking and aligning arrangement for laminations which ensures an accurate aligning and stacking of laminations provided with a circular inner or outer circumference under all operating conditions.

Yet another object of the present invention resides in providing an aligning and stacking arrangement for laminations which produces a stack which takes into account any variation in thicknesses of the individual laminations which occurs in a normal stacking operation.

A still further object of the present invention resides in providing an aligning and stacking arrangement for laminations which ensures a predetermined orientation of non-circular outer contours of laminations with a circular inner circumference from one lamination to the next and throughout the height of the stack.

A still furthr object of the present invention resides in providing an aligning and stacking arrangement for laminations which is relatively simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention and wherein:

FIG. 1 is a vertical partial cross-sectional view through a lamination aligning and stacking arrangement in accordance with the present invention;

FIG. 2 is a top view of the lamination aligning and stacking arrangement of FIG. 1; and FIG. 3 is a cross-sectional view taken along line III—III of FIG. 1.

Referring now to the drawings wherein like reference numerals are used throughout the various views to designate like parts and, more particularly, to FIG. 1, according to this figure, a guide ring 2 is rotatably mounted in a frame 1 with a support bushing 3 being guided displaceably in the guide ring 2. A pressure medium actuated cylinder-piston unit 5 is connected to one side of the support bushing 3 and on the other side to a lower cross brace 4 of the frame 1. The cylinder-piston unit 5 is selectively connectable in a conventional manner with a pressure medium source (not shown) so as to permit a selective raising and lowering of the support bushing 3.

A stack former which includes a mandrel consisting of a lower mandrel element 6 and an upper mandrel element 11 is provided with the lower mandrel element 6 being mounted on the upper end of the support bushing 3 so as to form an upwardly directed annular step 7 at the junction between the support bushing 3 and the lower end of the mandrel element 6 with the laminations 8 being brought into engagement and resting on the step 7 during a stacking operation. The upper mandrel element 11 is mounted on the lower mandrel element 6 by way of cooperating upwardly tapering conical sections 9, 10 provided on the lower end of the mandrel element 11 and upper end of the mandrel element 6, respectively. A centering bore is located in the support surfaces defined by conical sections 9, 10 on the upper and lower mandrel elements 11, 6, respectively, with an eccentrically located centering pin 12 being receivable in the centering bore.

An upwardly tapering cone 13 is provided on the upper end of the mandrel element 11 for threading the supplied laminations of the mandrel element 11. A vertically extending guide rib or ridge 14, 15 is provided on the outer circumference of each of the mandrel elements 11, 6, respectively, with the guide ribs or ridges 14, 15 being brought into vertical alignment with one another when the mandrel elements 6, 11 are connected together by way of the conical sections 9, 10, the corresponding support surfaces, and the engagement of the centering pin 12 in the centering bore.

A rotary ring, including an inner ring 17 and an outer ring 18 relatively rotatable with respect to each other, is rotatably mounted relative to the axis of the mandrel elements 6, 11 at an upper plate 16 of the frame 1 which defines an intermediate stacking area for the laminations 8. The rotary ring is provided with an opening for permitting a passage of the laminations 8 therethrough. Radially displaceable pins 19 are mounted in radial bores in the inner ring 17 with the pins 19 being insertable into corresponding radial lined holes provided at the upper mandrel element 11.

A radial displacement of pins 19 in the bores in the inner ring 17 is effected by rotating the outer ring 18 relative to the inner ring 17. For this purpose, as shown most clearly in FIG. 2, the outer ends of the pins 19 are guided by links and cam surfaces 18a, 18b, 18c provided in the outer ring 18 with the radial distances of the cam surfaces 18a–18c from the axis of the upper mandrel element 11 changing between the two ends by the degree of displacement of the pins 19. A drive means 20 has a drive gear 20a arranged on the drive shaft thereof which engages with gear teeth 18d of the outer ring 18 so as to cause a relative rotation of the outer ring 18 with respect to the inner ring 17.

As shown in FIGS. 2 and 3, the guide ring 2 and inner ring 17 are each provided with a plurality of teeth 2a, 17a disposed about the outer circumference with the teeth 2a, 17a being constantly meshed with pinions 23, 22, respectively, mounted on a shaft 21 rotatably disposed in the frame 1. A rotary drive means including a drive connection 25 and a drive motor 24 causes a selective driving of the shaft 21 so as to rotate the same in a stepwise fashion.

As shown in FIG. 1, the guide ring 2 is provided on its underside with a drive bore 26 which receives a drive pin 27 mounted with a spring tension in a lower flange of the support bushing 3. The drive pin 27 is brought into engagement with the drive bore 26 when the support bushing 3 is raised to its upper end position by the cylinder-piston unit 5.

The constant meshing of pinions 22, 23 with the teeth 17a, 2a, respectively, ensures that the two rings, 2, 17 are kept at a constant angular position relative to the axis of the mandrel elements 6, 11. The drive pin 27 which is received in the drive bore 26 when the support bushing 3 is raised in a certain angular position ensures that the lower mandrel element 6 fits with its conical section 9 in the angular position in the conical section 10 in the upper mandrel element 11 in which the centering pin 12 can fit into the corresponding centering bore whereby a rotary connection is produced between the lower mandrel element 6 and upper mandrel element 11 in an angular position in which the guide ridges or ribs 14, 15 are in vertical alignment with one another.

When the support bushing 3 together with the lower mandrel element 6 is displaced to the lower end position by the cylinder-piston unit 5, the stack consisting of laminations 8 rests on a support surface 28 which is integral with the frame 1 and the stack of laminations 8 can then be shifted onto a horizontal conveyor 31 by a horizontally operating pusher plate 30 driven by a pressure medium actuated cylinder-piston unit 29 mounted on the frame 1.

When the support bushing 3 along with the lower mandrel element 6 is raised to the upper end position by the cylinder-piston unit 5, a rotary connection are established between the upper mandrel element 11 by way of the centering pin 12 and associated centering bore so that both the mandrel elements 6, 11 of the stack former can be rotated stepwise by the lower pinion 23. In the upper end position of the support bushing 3, the pins 19 are disposed in their radially outwardly displaced end position out of engagement with the blind holes in the mandrel element 11 so that the pins 19 are ineffective to form an intermediate stack of laminations 8, whereby the laminations 8 are then stacked on the lower mandrel element 6.

Once a stack of laminations 8 has been formed, the pins 19 are then displaced radially inwardly to their end positions by the drive means 20 so that the pins 19 are received within the blind holes in the upper mandrel element 11. Laminations 8 are then stacked on the pins 19 at the upper mandrel element 11 which can be rotated in a stepwise manner by the upper pinion 22. Simultaneously, the support bushing 3 and the lower mandrel element 6 are displaced to the lower end position so that the stack of laminations 8 which has been formed is displaced onto the conveyor 31 by the pusher plate 30.

When the support bushing 3 and lower mandrel element 6 are again raised by the cylinder-piston unit 5, the drive pin 27 is inserted into the drive bore 26 as the guide ring 2 continues to rotate in a stepwise manner and the centering pin 12 enters the corresponding centering bore whereby the rotary connection of the upper and lower mandrel elements 11, 6, is reestablished and the upper mandrel element 11 is again resting upon the lower mandrel element 6. The pins 19 are then moved radially outwardly to their outer end positions by the drive means 20 and are rendered inoperative so that the intermediate stack of laminations 8, formed by the pins 19 on the upper mandrel element 11 during the lowering and subsequent raising of the support bushing 3 and lower mandrel element 6, then falls onto the annular step 7 at the lower end of the mandrel element 6.

The stack former may also be constructed of upper and lower tubular members having a circular inner circumference for stacking laminations with a circular outer circumference. The inner circumference of the tube may be provided with at least one guide ridge or rib for engaging groove-shaped stampings extending out from the circular outer circumference of the laminations 8. In such construction, the stack former would surround the intermediate stacking area and the pins 19 would be selectively displaceable into and out of holes or bores provided in the upper tubular member. As apparent, with the pins 19 being displaced into the holes in the upper tubular member, laminations dropping into the tubular member would come to rest on the projecting pins 19 so as to form an intermediate stack in the upper tubular member while the lower tubular member is displaced to a lower end position so as to permit removal of the stack of laminations contained therein and subsequently raised to an upper end position in engagement with the upper tubular member.

While we have shown and described only one embodiment in accordance with the present invention, it is understood that the same is not limited thereto but is susceptible of numerous changes and modification as known to a person skilled in the art and we therefore do not wish to be limited to the details shown and described herein but intend to cover all such modifications as are encompassed by the scope of the appended claims.

We claim:

1. An arrangement for aligning and stacking of laminations and for transporting formed stacks of laminations, the laminations having stamped patterns defining a plurality of stampings distributed in a circular configuration about the laminations at equal centering angles, the arrangement comprising:

a stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member, means for rotatably mounting said stack forming means so as to be rotatable about a longitudinal axis thereof, means for rotatably driving said stack forming means in a stepwise manner with rotary steps of the driving means being equal to one of a central angle of the stampings of the stamped pattern and a whole number multiple thereof, means for forming an intermediate stack of laminations at the upper stack forming member including at least one intermediate stack forming member selectively displaceable into and out of an intermediate stack forming area, the stack forming area surrounding the stack forming means at least in an area of the upper stack forming member, wherein the upper stack forming member is provided with means for accommodating said at least one intermediate stack forming member so as to grip said upper stack forming member and hold the same in a given position, means for rotatably mounting said intermediate stack forming means, and means for operatively connecting said intermediate stack forming means with said driving means such that said intermediate stack forming means is rotatably driven in a stepwise manner with rotary steps being equal to one of the central angle of the stampings of the stamped pattern and a whole number multiple thereof.

2. An arrangement according to claim 1, wherein at least one guide means is provided at the stack forming means, said at least one guide means being engageable with at least one of the stampings of a lamination for maintaining the relative position of the lamination at the stack forming means during a stacking operation.

3. An arrangement according to claim 2, wherein the laminations are laminations for electrical equipment.

4. An arrangement according to claim 2, wherein the laminations include a circular inner circumference, and wherein said stack forming means is constructed of at least one mandrel having a circular outer circumference.

5. An arrangement according to claim 4, wherein the stampings of the laminations are groove-shaped stampings extending outwardly from the circular inner circumference of the laminations, and wherein said guide means includes at least one guide ridge provided along the circular outer circumference on said at least one mandrel, said guide ridge being engageable with at least one of the groove-shaped stampings.

6. An arrangement according to claim 1, wherein the stack forming means is constructed of at least one tube having a circular inner circumference.

7. An arrangement according to claim 6, wherein at least one guide means is provided at the inner circumference of said at least one tube, said at least one guide means being engageable with at least one of the stampings of a lamination for maintaining the relative position of the lamination at the stack forming means.

8. An arrangement according to claim 7, wherein the stampings of the laminations are groove-shaped stampings extending out from the circular outer circumference, and wherein said at least one guide means includes at least one guide ridge arranged at the inner circumference of the at least one tube.

9. An arrangement for aligning and stacking of laminations and for transporting formed stacks of laminations, the laminations having stamped patterns defining a plurality of stampings distributed in a circular configuration about the laminations at equal centering angles, the arrangement comprising:
a stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member,
means for rotatably mounting said stack forming means so as to be rotatable about a longitudinal axis thereof,
means for rotatably driving said stack forming means in a stepwise manner with rotary steps of the driving means being equal to one of a central angle of the stampings of the stamped pattern and a whole number multiple thereof,
means for forming an intermediate stack of laminations at the upper stack forming member including at least one intermediate stack forming member selectively displaceable into and out of an intermediate stack forming area, the stack forming area surrounding the stack forming means at least in an area of the upper stack forming member,
wherein the upper stack forming member is provided with means for accommodating said at least one intermediate stack forming member so as to grip said upper stack forming member and hold the same in a given position,
wherein said rotatable driving means is operatively connected with said intermediate stack forming means so as to form a common rotary drive, and
wherein means are provided for selectively connecting the common rotary drive with one of the stack forming means and the intermediate stack forming means and the upper stack forming member alone so as to maintain a uniform operation.

10. An arrangement for aligning and stacking of laminations and for transporting formed stacks of laminations, the laminations having stamped patterns defining a plurality of stampings distributed in a circular configuration about the laminations at equal centering angles, the arrangement comprising:
a stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member,
means for forming an intermediate stack of laminations at the upper stack forming member including a plurality of intermediate stack forming members selectively displaceable into and out of an intermediate stack forming area, the stack forming area surrounding the stack forming means at least in an area of the upper stack forming member,
a rotary ring having at least two ring members rotatable relative to one another,
means for permanently coupling one of said ring members to said rotatable driving means, each of the intermediate stack forming members is constructed as a holding element mounted at said rotary ring so as to be displaceable into and out of engagement with the upper stack forming member,
wherein the upper stack forming member is provided with means for accommodating said stack forming means so as to grip said upper stack forming member and hold the same in a given position.

11. An arrangement according to claim 10, wherein said holding elements are displaceable approximately in a radial direction, and wherein means are provided for selectively driving the other of said two ring members for causing a displacement of said plurality of holding elements.

12. An arrangement for aligning and stacking of laminations and for transporting formed stacks of laminations, the laminations having stamped patterns defining a plurality of stampings distributed in a circular configuration about the laminations at equal centering angles, the arrangement comprising:
a stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member,
means for rotatably mounting said stack forming means so as to be rotatable about a longitudinal axis thereof,
means for rotatably driving said stack forming means in a stepwise manner with rotary steps of the driving means being equal to one of a central angle of the stampings of the stamped pattern and a whole number multiple thereof,
means for forming an intermediate stack of laminations at the upper stack forming member including at least one intermediate stack forming member operable within an intermediate stack forming area, said stack forming means surrounding the intermediate stack forming area at least in an area of the upper stack forming member, wherein the upper stack forming member is provided with means for accommodating said at least one intermediate stack forming member so as to grip said upper stack forming member and hold the same in a given position, means for rotatably mounting said intermediate stack forming means, and means for operatively connecting said intermediate stack forming means with said driving means such that said intermediate stack forming means is rotatably driven in a stepwise manner with rotary steps being equal to one of the central angle of the stampings of the stamped pattern and a whole number multiple thereof.

13. An arrangement according to claim 12, wherein the stack forming means is constructed of at least one tube having a circular inner circumference.

14. An arrangement according to claim 13, wherein at least one guide means is provided at the inner circumference of said at least one tube, said at least one guide means being engageable with at least one of the stampings of a lamination for maintaining the relative position of the lamination at the stack forming means.

15. An arrangement according to claim 14, wherein the stampings of the laminations are groove-shaped stampings extending out from an outer circumference of the laminations, and wherein said at least one guide means includes at least one guide ridge arranged at the inner circumference of the at least one tube.

16. An arrangement for aligning and stacking of laminations and for transporting formed stacks of laminations, the laminations having stamped patterns defining a plurality of stampings distributed in a circular configuration about the laminations at equal centering angles, the arrangement comprising:

a stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member, means for rotatably mounting said stack forming means so as to be rotatable about a longitudinal axis thereof, means for rotatably driving said stack forming means in a stepwise manner with rotary steps of the driving means being equal to one of a central angle of the stampings of the stamped pattern and a whole number multiple thereof, means for forming an intermediate stack of laminations at the upper stack forming member including at least one intermediate stack forming member operable within an intermediate stack forming area, said stack forming means surrounding the intermediate stack forming area at least in an area of the upper stack forming member, wherein the upper stack forming member is provided with means for accommodating said at least one intermediate stack forming member so as to grip said upper stack forming member and hold the same in a given position, wherein said rotatable driving means is operatively connected with said intermediate stack forming means so as to form a common rotary drive, and wherein means are provided for selectively connecting the common rotary drive with one of the stack forming means and the intermediate stack forming means and the upper stack forming member alone so as to maintain a uniform operation.

17. An arrangement for aligning and stacking of laminations and for transporting formed stacks of laminations, the laminations having stamped patterns defining a plurality of stampings distributed in a circular configuration about the laminations at equal centering angles, the arrangement comprising:

stack forming means for receiving laminations fed individually thereto in the same position including at least two stack forming members mounted so as to be selectively separable, said at least two stack forming members being disposed one above the other in a longitudinal direction of the stack forming means so as to form an upper stack forming member and a lower stack forming member, means for rotatably mounting said stack forming means so as to be rotatable about the longitudinal axis thereof, means for rotatably driving said stack forming means in a stepwise manner with rotary steps of the driving means being equal to one of a central angle of the stampings of the stamped pattern and a whole number multiple thereof, means for forming an intermediate stack including a plurality of intermediate stack forming members, a rotary ring having at least two ring members rotatable relative to one another, means for permanently coupling one of said ring members to said rotatable driving means, each of said intermediate stack forming members is constructed as a holding element mounted at said rotary ring so as to be displaceable into and out of engagement with the upper stack forming member, wherein the upper stack forming member is provided with means for accommodating said plurality of stack forming member so as to grip said upper stack forming member and hold the same in a given position.

18. An arrangement according to claim 17, wherein said holding elements are displaceable approximately in a radial direction and wherein means are provided for selectively driving the other of said two ring members for causing a displacement of said plurality of holding elements.

* * * * *